3,501,533
RECOVERY OF FLUORINATED ETHER
Louis G. Anello, Basking Ridge, and Richard F. Sweeney, Randolph Township, Morris County, N.J., assignors to Allied Chemical Corporation, New York, N.Y., a corporation of New York
No Drawing. Filed Sept. 6, 1967, Ser. No. 665,712
Int. Cl. C07c 43/12, 121/18; B01d 3/36
U.S. Cl. 260—614                                     1 Claim

ABSTRACT OF THE DISCLOSURE

This invention relates to a process for separating hexafluoromonochloroisopropyl,2' - iodotetrafluoroethyl ether from a mixture containing 1,2-diiodotetrafluoroethane as a by-product. According to the invention, the mixture is made to contain at least about 8 mols of acetonitrile per mol of hexafluoromonochloroisopropyl,2' - iodotetrafluoroethyl ether and the mixture is then fractionally distilled to give an azeotrope of hexafluoromonochloroisopropyl, 2'-iodotetrafluoroethyl ether and acetonitrile as an overhead fraction, while leaving the 1,2-diiodotetrafluoroethane as a residue. The acetonitrile is then separated from the hexafluoromonochloroisopropyl,2' - iodotetrafluoromonochloroisopropyl,2' - iodotetrafluoroethyl ether by water extraction.

---

In copending U.S. patent application 492,276 of Litt et al., filed Oct. 1, 1965, there is disclosed a process for the preparation of hexafluoromonochloroisopropyl,2' - diiodotetrafluoroethyl ether by reacting pentafluoromonochloroacetone with a metal fluoride such as sodium, potassium, rubidium or cesium fluoride to form a fluorinated organic salt and then reacting this salt with tetrafluoroethylene and iodine (or a mixture of iodine and iodine monochloride) to give the desired ether. The reactions involved are illustrated by the following equations in which the metal fluoride is potassium fluoride:

(1) 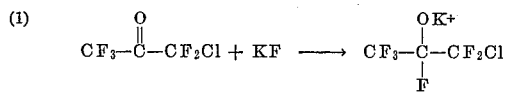

(2) 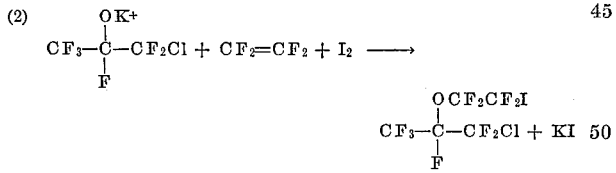

The two reactions are preferably carried out in a liquid medium which is a solvent for the fluorinated organic salt. Liquid media suitable for both reactions are lower alkyl nitriles, such as acetonitrile; lower alkyl t-amides, such as dimethyl formamide; nitrobenzene; butyrolactone; sulfolanes such as 2-methyl sulfolane and sulfones such as methyl ethyl sulfone.

During the course of the second reaction, 1,2-diiodotetrafluoroethane is formed as a by-product. The boiling point of the 1,2-diiodotetrafluoroethane and hexafluoromonochloroisopropyl, 2' - iodotetrafluoroethyl ether are very close, being 114° and 115° C. respectively, and a mixture consisting essentially of these two compounds cannot be separated by fractional distillation.

In accordance with the present invention, it has been discovered that hexafluoromonochloroisopropyl,2' - iodotetrafluoroethyl ether and acetonitrile form an azeotrope having a boiling point of about 79 to 81° C. It has been determined that the azeotrope contains about 8 mols of acetonitrile per mol of hexafluoromonochloroisopropyl,2'-iodotetrafluoroethyl ether. Thus by taking a reaction product containing 1,2 - diiodotetrafluoroethane and hexafluoromonochloroisopropyl,2' - iodotetrafluoroethyl ether and adjusting the composition so that at least 8 mols of acetonitrile are present for each mol of the ether, a fractional distillation can be carried out in which an azeotrope of acetonitrile and hexafluoromonochloroisopropyl,2' - iodotetrafluoroethyl ether is separated from 1,2-diiodotetrafluoroethane. Then, since acetonitrile is soluble in water, it can be separated from the hexafluoromonochloroisopropyl, 2'-iodotetrafluoroethyl ether by water extraction.

Preferably, the reactions illustrated by Equations 1 and 2 are run using acetonitrile as the liquid solvent and this acetonitrile makes up all or part of acetonitrile required to form the azeotrope with the hexafluoromonochloroisopropyl,2'-iodotetrafluoroethyl ether during fractional distillation. However, if desired, the liquid media employed during the reaction can be any of the other suitable compounds discussed above. After the reaction is completed, such compounds are removed from the reaction product and then a sufficient quantity of acetonitrile added.

In the fractional distillation, the azeotrope can be recovered over a relatively narrow temperature range such as 79 to 81° C. However, higher yields are obtained using a broader range. The important limitation of this temperature range is the upper temperature, which must be low enough so that effective separation from the 1,2-diiodotetrafluoroethane is obtained. Preferably, an upper temperature of about 83° C. is employed when recovering the azeotrope in the overhead fraction. The lower end of the temperature range is not important, since after removing acetonitrile from the azeotrope by water extraction, hexafluoromonochloroisopropyl,2' - iodotetrafluoroethyl ether has a boiling point of 115° C. and can be readily separated from low boiling contaminants by further fractional distillation. For example, when the reaction illustrated by Equation 2 is carried out replacing the iodine with a mixture of iodine and iodine monochloride, one of the products is 1 - chloro - 2 - iodotetrafluoroethane which has a boiling point of 56° C. If the overhead fraction is recovered over a broad range, such as 40° to 83° C., both 1 - chloro - 2 - iodotetrafluoroethane and any excess acetonitrile are included in the overhead fraction. Water extraction removes both the excess acetone and that which forms part of the azeotrope, and then the hexafluoromonochloroisopropyl,2' - iodotetrafluoroethyl ether is readily separated from the 1 - chloro - 2 - iodotetrafluoroethane by fractional distillation.

The hexafluoromonochloroisopropyl,2' - iodotetrafluoroethyl ether recovered by the present invention can be used as an intermediate in the preparation of a number of useful products. Fluorinated acids useful as surfactants can be prepared by reacting hexafluoromonochloroisopropyl,2'-iodotetrafluoroethyl ether with a Grignard reagent to form a magnesium halide adduct, reacting this adduct with $CO_2$ to form a magnesium halide salt and then acidifying this salt. This procedure is illustrated in Example 6 of copending application 492,276. Also, hexafluoromonochloroisopropyl,2' - iodotetrafluoroethyl ether can be reacted with tetrafluoroethylene to give liquid products of the formula

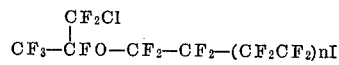

with $n$ preferably being about 1–10. These liquids are useful as condenser fluids, hydraulic fluids, lubricants, heat transfer media and refrigerants. The reaction with tetrafluoroethylene is inhibited by the presence of 1,2-diiodotetrafluoroethane and thus it is of great importance to remove this impurity by the present invention.

The following example is given to further illustrate the invention, but it is to be understood that the invention is not to be limited in any way by the details described therein. In the example, parts are by weight.

EXAMPLE

Into a three-necked flask equipped with a stirrer, thermometer, −78° C. condenser and a gas inlet tube, were charged 2500 ml. of acetonitrile and 191.4 grams of anhydrous KF. With stirring, 546 grams of pentafluoromonochloroacetone was added, followed by the addition of 762 grams of iodine. Then 294 grams of ICl dissolved in 200 ml. of acetonitrile was slowly added while 138 liters of tetrafluoroethylene was fed into the reaction system over a 23 hour period.

The resulting reaction mixture, 4098 grams, was divided into two portions. Portion A (3483 grams) was extracted with ice water, thereby removing the acetonitrile as well as any water soluble products and excess reactants which might have been present. The washed, water-insoluble oil, 699 grams, was admixed with 400 ml. of acetonitrile and fractionally distilled. An overhead fraction (568.5 grams) was collected at a temperature of 47° to 83° C. The distillate was extracted with water to remove the acetonitrile and then fractionally distilled.

A first fraction containing $CF_2ICF_2Cl$ and some acetonitrile/hexafluoromonochloroisopropyl,2′ - iodotetrafluoroethyl ether azeotrope was collected below 115° C. A total of 369.6 grams of hexafluoromonochloroisopropyl, 2′-iodotetrafluoroethyl ether was collected at 115° to 116° C. The purity of this compound was determined to be 99.5% by chromatographic analysis.

Portion B (615 grams) was fractionally distilled without first extracting with water. Fractions were collected as follows:

| Fraction | Grams | Boiling Point ° C. |
|---|---|---|
| 1 | 107.5 | 61–79 |
| 2 | 96.5 | 79–81 |
| 3 | 86.0 | 81–82 |
| 4 | 49.0 | 82 |
| 5 | 241.0 | Remainder |
| 6 | 28.0 | (¹) |

¹ Recovered in −78° C. trap.

Fraction 1 contained the $CF_2ICF_2Cl$ present in the reaction product plus some hexafluoromonochloroisopropyl,2′-iodotetrafluoroethyl ether and some acetonitrile. Fraction 2 was composed of an azeotropic mixture of 52.5 grams of hexafluoromonochloroisopropyl,2′-iodotetrafluoroethyl ether and 44 grams of acetonitrile. Fraction 3 was composed primarily of acetonitrile (81 grams) with the remainder being hexafluoromonochloroisopropyl,2′-iodotetrafluoroethyl ether. Fraction 4 was composed entirely of acetonitrile and Fraction 5 was composed of 6 grams of $CF_2ICF_2I$ and 235 grams of acetonitrile.

Fractions 1 to 5 were separately extracted with water to remove the acetonitrile. Fractions 1 to 3 were then combined and fractionally distilled as follows:

| Fraction | Grams | Boiling point ° C. | Composition |
|---|---|---|---|
| 1 | 18 | 53–58 | $CF_2ICF_2Cl$ |
| 2 | 15 | 53–114 | Mixture of $CF_2ICF_2Cl$ and $CF_3(CF_2Cl)CFOCF_2CF_2I$ |
| 3 | 88 | 114–116 | $CF_3(CF_2Cl)CFOCF_2CF_2I$ |
| 4 | 4 | Remainder | $CF_3(CF_2Cl)CFOCF_2CF_2I$ |

Chromatographic analysis showed Fraction 3 to be 99.5% purity.

It will be apparent that many modifications and variations can be effected without departing from the scope of the novel concepts of the present invention, and the illustrative details disclosed are not to be construed as imposing unnecessary limitations on the invention.

We claim:
1. An azeotrope of hexafluoromonochloroisopropyl,2′-iodotetrafluoroethyl ether and acetonitrile having a boiling point of about 79 to 81° C. and containing about 8 mols of acetonitrile per mol of hexafluoromonochloroisopropyl,2′-iodotetrafluoroethyl ether.

References Cited

UNITED STATES PATENTS 3,409,512  11/1968  Anello et al.

LEON ZITVER, Primary Examiner

HOWARD T. MARS, Assistant Examiner

U.S. Cl. X.R.

203—45; 260—465.1, 616